United States Patent [19]

Braun

[11] 4,032,396

[45] June 28, 1977

[54] PRESSURIZED-WATER REACTOR EMERGENCY CORE COOLING SYSTEM

[75] Inventor: Wolfgang Braun, Buckenhof, Germany

[73] Assignee: Siemens Aktiengesellschaft, Munich, Germany

[22] Filed: Mar. 28, 1974

[21] Appl. No.: 455,913

[30] Foreign Application Priority Data

Mar. 30, 1973  Germany ................ 2316007

[52] U.S. Cl. .......................... 176/38; 176/37
[51] Int. Cl.² .................... G21C 9/00; G21C 15/00
[58] Field of Search ...................... 176/37, 38

[56] References Cited

UNITED STATES PATENTS

| 3,379,613 | 4/1968 | Tagami et al. ............ 176/37 |
| 3,528,884 | 9/1970 | Collier et al. ............ 176/37 |
| 3,816,245 | 6/1974 | Bevilacqua ............... 176/61 |

FOREIGN PATENTS OR APPLICATIONS

| 291,909   | 5/1967  | Australia ............... 176/38 |
| 45-38120  | 12/1970 | Japan ................... 176/37 |

Primary Examiner—Stephen C. Bentley
Assistant Examiner—Ralph Palo
Attorney, Agent, or Firm—Kenyon & Kenyon, Reilly, Carr & Chapin

[57] ABSTRACT

A pressurized-water reactor emergency core cooling system, in the event of a loss-of-coolant accident, has means for introducing at least one-quarter of the emergency cooling water supply, directly into the open space formed between and around the control rod guide tubes of the reactor's upper guide and support structure above the reactor's core and within the pressure vessel. The water introduced is under pressure and is done in such a way as to form a wide-area spray screen filling the open space with the sprayed water as completely as possible. By cooling this space via the sprayed water, the steam that would otherwise fill this space, is condensed and the reactor's internal pressure very substantially reduced, permitting the balance of the emergency cooling water, which is also introduced to the pressure vessel, to flow to the bottom of the vessel and fill it up with upwardly rising cooling water to above the upper level of the core and into the open space. Other features are included.

7 Claims, 7 Drawing Figures

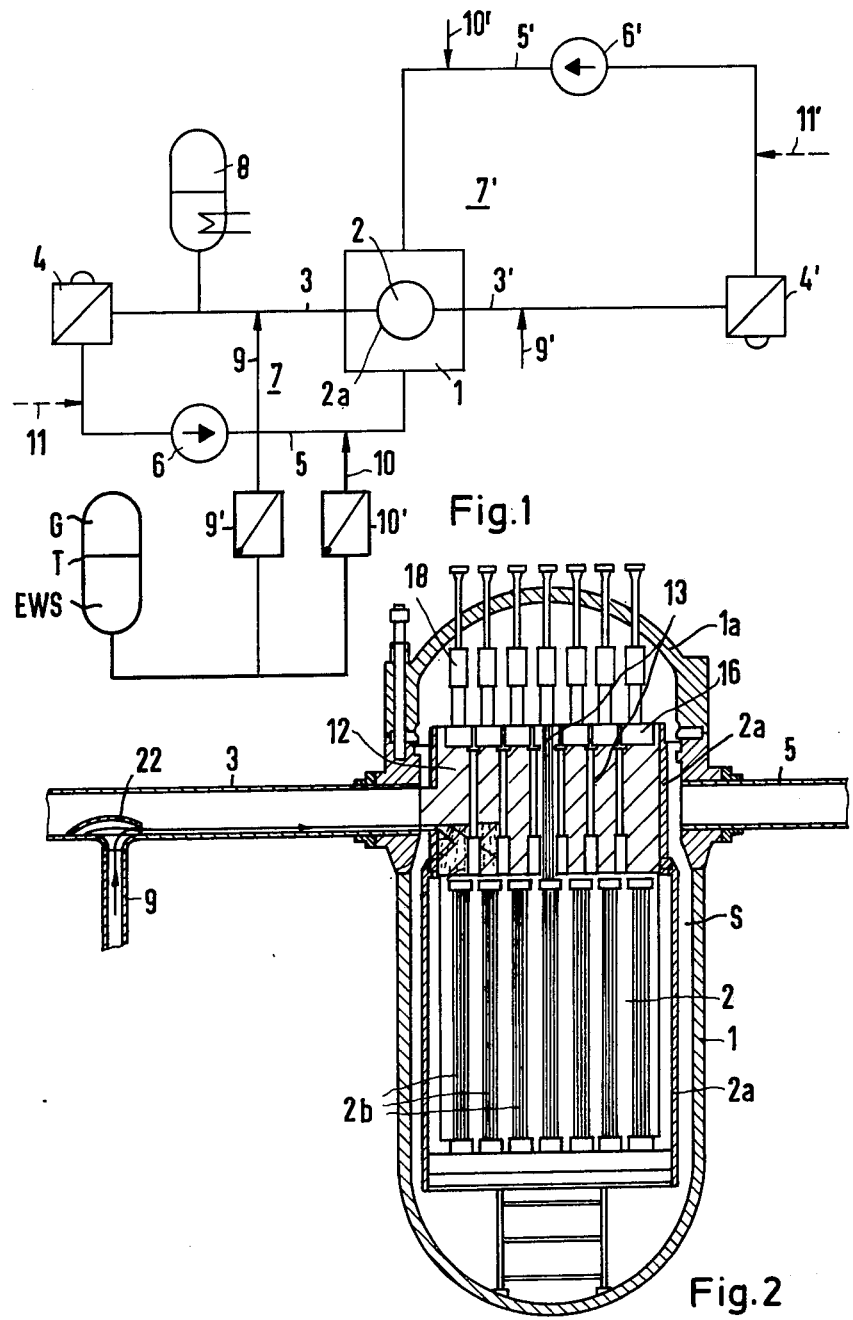

PRESSURIZED-WATER REACTOR EMERGENCY CORE COOLING SYSTEM

BACKGROUND OF THE INVENTION

A pressurized-water reactor power installation includes the vertical pressure vessel containing a core formed by vertical fuel assemblies supported in a core barrel forming between its outside and the inside of the pressure vessel, a descent space for pressurized-water coolant. At a level above the top of the core, the vessel has two or more coolant inlet connections and two or more outlet connections, the inlet connections communicating with the space between the core barrel and the vessel and descending through this descent space to the bottom of the vessel and rising upwardly through the inside of the core barrel via its opened bottom, the core barrel above the top level of the core communicating with the outlet connections. This permits the coolant to circulate upwardly through the core to cool individual vertical fuels rods mounted in clusters by the fuel assemblies.

The vessel's outlet connections connect with main coolant pipe line loops each having a hot leg which goes directly to the inlet of the primary header of a steam generator where the coolant circulates through the U-tube bundle heat-exchanger in the steam generator housing to which feed water is introduced for heating to steam, the steam leaving the steam generator for use as a power source. The steam generator primary header's outlet connects with the primary loop cold leg containing the coolant circulating main coolant pump and which goes back to the pressure vessel where it connects with the vessel's inlet connection. One such main coolant loop is provided for each steam generator included by the installation. The terms, hot leg and cold leg, are used because in the hot leg the coolant is carrying away the core heat to the steam generator where the coolant gives up the heat to the feed water, the cold leg carrying the coolant of reduced temperature back to the pressure vessel for recirculation through its core.

The core is within the lower portion of the pressure vessel and the core barrel extends upwardly to above the level of the vessel's coolant connections and contains above the core an upper guide and support structure containing interspaced control rod guide tubes for control rods which extend downwardly through the vessel's top or cover and via these guide tubes downwardly into the core below, the control rods being used to control the reactivity of the core by being raised and lowered via external control rod drive mechanisms above the outside of the vessel's cover. The top of the core barrel terminates below the inside of the vessel's cover and has a core barrel cover plate with openings through which the control rod guide tubes extend down through the guide tubes of the upper guide and support structure.

Thus, the core barrel defines a space between the top of the core and the bottom of the core barrel cover plate and which communicates with the hot leg connections which extend through the vessel's wall. This space is traversed only by the control rod guide tubes of the upper guide and support structure, these guide tubes are relatively widely interspaced horizontally from each other, and therefore, this space above the core within the core barrel, formed between and around the guide tubes, is relatively open and of large area.

Although unlikely, it is possible for one of the coolant loops to suffer a break while the reactor is in operation. In that event the coolant circulation through the core stops. Reactor installations necessarily have a reactor protective system which is triggered should such an accident occur, all of the control rods being then dropped to terminate the reactivity of the core. However, the residual heat of the core and the decay heat of its fuel cause the temperature of the core to rapidly rise. Therefore, a reactor installation necessarily incudes an emergency core cooling system for use in the event of such a loss-of-coolant accident.

Such a system includes an accumulator containing a supply of emergency cooling water under gas pressure in the accumulator tank and which is intended to be adequate, if promptly and properly introduced to the core vessel, to keep the core temperature under control until other remedial measures may be taken.

Such a system is also activated by the reactor protective system, when required.

With the core temperature rapidly rising, when the coolant circulation stops, the introduction to the vessel of the emergency cooling water involves problems. With the main loop suffering a break, the pressure on the water coolant drops within the pressure vessel so that coolant remaining there converts to steam which drives out of the vessel and escapes via the break. Therefore, one of the problems involved by the introduction of the emergency cooling water to the vessel is the production of steam by contact of the water with the overheating core, this possibly filling the vessel, particularly its upper portion, with steam under high pressure. The emergencycooling water must be forced into the vessel against this pressure and this may require a force beyond the capacity of the accumulator gas pressure. If a pump is relied on to feed the emergency cooling water supply into the vessel, this pump must be very large and, therefore, expensive to provide the necessary pressure on the emergency cooling water and which must, of course, be higher than the steam pressure created within the vessel.

Normally the emergency cooling water is introduced to the vessel via either or both of the hot and cold legs of the main coolant loop, although it may be introduced via connections formed for this purpose through the vessel's wall. It is, of course, necessary for the emergency cooling water to get to the bottom of the vessel and fill the latter upwardly to above the top level of the core and to the vessel's coolant connections, and this should be done as quickly as possible.

SUMMARY OF THE INVENTION

The object which lead to the present invention was to provide a solution to the above problem of getting the emergency cooling water into the pressure vessel with as little hindrance, if any, by the steam developed in the vessel in the event of a loss-of-coolant accident.

As a solution to that problem, this invention provides for an emergency core cooling system including, of course, emergency means for supplying emergency cooling water from a volume of such water under pressure in the event of the loss-of-coolant accident, and spray means for supplying at least a portion of that emergency cooling water from that supply substantially throughout the open space above the core to form a large-area spray screen of the emergency cooling water in the open space. The open space referred to, is that formed between and around the guide tubes of the upper guide and support structure within the core barrel. About at least one-quarter of the volume of the supply of emergency cooling water, should be sprayed to form this large-area spray screen. Then, in addition, feeding means are provided for feeding the balance of the volume of the emergency core cooling water supply, into the descent space formed between the core barrel and the inside of the pressure vessel, which may be done by feeding the balance into the cold leg which is in direct communication with this descent space.

This large-area spray screen formed in the open space above the core has the function of condensing any steam in that space and by cooling action dropping the pressure existing in the pressure vessel and which otherwise hinders the introduction of additional emergency core cooling water to the vessel. When the balance is introduced via the cold leg to the descent space, in the absence of opposing excessive steam pressure, the balance can flow into the bottom of the core vessel and completely fill the vessel upwardly to at least above the level of the top of the core and preferably to the level of the main coolant loop connections of the pressure vessel.

As one means for producing the large-area spray above the core, the invention provides for a jet nozzle positioned in the hot leg of the main loop adjacent to its connection with the pressure vessel and pointing towards the upper guide and support structure exposed by the outlet connection of the pressure vessel. This nozzle may be streamlined externally so as not to interfere with the coolant flow when operations are normal. The guide tubes of the upper guide and support structure are hot, so the high-velocity jet of emergency coolant water ejected through the hot leg and the outlet connection of the pressure vessel, can impinge directly against the vertical, horizontally interspaced guide tubes, immediately producing the large-area spray of emergency cooling water in the relatively open space defined between and around the guide tubes. Both because of its relatively low temperature and its evaporation, this large-area spray of water rather promptly condenses the steam which would otherwise oppose the entry of the cooling water, the evaporation of the emergency cooling water of the spray adding to the cooling and pressure reduction effect. Simultaneously or thereafter, the balance of the emergency cooling water, from its supply, is introduced to the vessel, this additional water now being able to fall to the bottom of the vessel and fill it in the upward direction.

The invention also contemplates an emergency cooling nozzle built into the side of the pressure vessel and pointing towards what might be called the forest of guide tubes so that, possibly added by appropriately positioned baffle plates, the large-area spray screen of emergency cooling water is formed throughout the open space between the guide tubes.

In yet another form, one or more emergency cooling water inlets may be formed in the pressure vessel's cover. This cover must be removable, as for core servicing for example, so an advantage of this invention is that the emergency cooling water may be simply introduced into the space beneath the pressure vessel's cover and above the core barrel's cover plate above the upper guide and support structure. By providing this cover plate with downwardly pointing nozzle assemblies, the water introduced under pressure above the cover plate is sprayed downwardly into the open space between the guide tubes below the cover plate. A variation of this consists in providing the cover plate of the upper guide and support structure of the reactor vessel, with downwardly depending pipes having tops open to the emergency cooling water introduced to the vessel above the cover plate and having horizontally ejecting nozzles along the lengths of these pipes. Such vertical pipes may possibly be provided by the vertical control rod guide tubes, of which all may not necessarily be used, the guide tubes involved having the horizontally pointing nozzles which eject the emergency cooling water supplied via the pressure vessel's cover horizontally against others of the guide tubes.

Throughout the above, it is to be understood that the portion of the emergency cooling water supply used to form the large-area spray screen, must be ejected into the open area above the core within the core barrel, at high velocities and high flow rates. This may be done by appropriate design of the nozzles used for that purpose. The emergency cooling water is maintained in the accumulator of the normal emergency core cooling system, under a relatively high gas pressure and such pressure is sufficient, accelerated with appropriate nozzle design, to provide for the immediate and extensive formation of the large-area water spray screen in the open space above the reactor core, to a degree promptly and adequately condensing the steam and dropping the pressure within the pressure vessel, as required to permit the introduction of cooling water in the bottom of the vessel in the event of a loss-of-coolant accident.

BRIEF DESCRIPTION OF THE DRAWINGS

The presently preferred mode for carrying out this invention is illustrated by the accompanying drawings in which:

FIG. 1 is a diagram of the elements required to effect the present invention;

FIG. 2 is a vertical section of a typical pressurized-water reactor and showing a portion of the hot leg of one main coolant loop, with the nozzle for ejecting the emergency cooling water towards the previously referred to open space, when required;

DETAILED DESCRIPTION OF THE INVENTION

Figure 3:
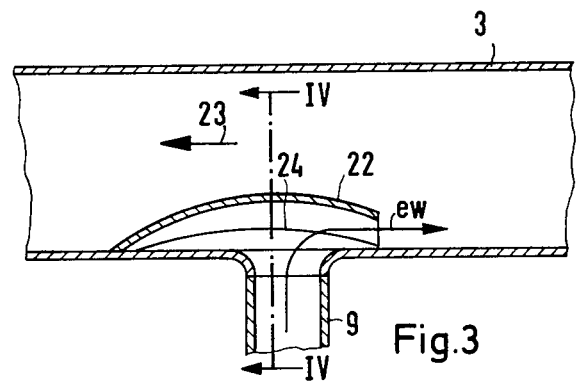
FIG. 3 is a vertical section on a substantially enlarged scale showing the details of the above referred to nozzle.

Having reference first to the diagram of FIG. 1, the vertical pressure vessel 1 contains the core 2 horizontally surrounded by the core barrel 2a from which the hot leg 3, of one of the main coolant loops 7, goes to the steam generator 4 and back via the cold leg 5 to the pressure vessel 1, the cold leg having the interposed main coolant pump 6 for circulating the coolant. The other main coolant loop 7' has corresponding parts correspondingly numbered with the numerals primed for individual identification. A pressurizer 8 connecting with the hot leg 3 and, therefore, with the inside of the pressure vessel 1, and the other main loop 7', keeps the water coolant pressurized to prevent it from boiling when heated by the reactor core to temperatures well above the boiling point of water when under only atmospheric pressure.

In the event of a loss-of-coolant accident, a typical emergency core cooling system would introduce the emergency cooling water to the main loop as illustrated, the emergency water being forced into either the hot leg 3 at 9 or the cold leg 5 at 10, the same corresponding at 9' and 10' in the case of the other main coolant loop 7'. As shown by FIG. 1, the emergency core cooling water supply EWS may be contained in the tank T of an accumulator with gas G in the tank under pressure which is applied to the fixed volume of emergency water supply in the tank. This supply connects with the hot leg 3 via the line 9 and, possibly through a larger pipe line, at 10 with the cold leg 5. These details are not shown applied to the loop 7', but they would correspond. A check valve 9' in the line 9 and a check valve 10' in the line 10 are normally closed by the normal pressure of the pressurized-water coolant in the loop 7, this pressure being greater than the pressure of the gas G. In the event of a break in the main loop 3, the pressure drops and the valves 9' and 10' then open under the pressure of the gas G in the accumulator tank T. The pipe line 9, as explained here below, is used to create the large area water spray screen previously described, using a portion of the supply EWS, at least one-quarter of this supply, with the balance going to the cold leg via the pipe line 10 which is accordingly shown by a heavier line to be of larger capacity. However, the pipe line 9 is closest to the tank T and, therefore, initially receives the emergency core cooling water.

Referring now to FIG. 2, the pressure vessel 1 contains the core 2 positioned in the core barrel 2a and formed by the individual fuel assemblies 2b. The barrel 2a extends from the lower portion of the pressure vessel 1 upwardly into its upper portion and above the level of the connections for the main coolant loop legs 3 and 5. The cold leg 5 introduces the coolant into the annular descent space S formed between the outside of the barrel 2a and the inside of the vessel 1, the coolant descending to the bottom of the vessel 1 and rising through the core 2 inside of the barrel 2a and to the hot leg connection for the leg 3 which connects with the inside of the barrel 2a.

The previously referred to open space above the core 2 is indicated at 12 by cross-hatching, it being this space in which the large-area water spray is formed. The control rod guide tubes 13 are the only internal elements within this space 12, these tubes being part of the upper guide and support structure formed largely by the tubes 13 and having its top closed by a cover plate 16. The control rod guide tubes extend upwardly via extensions 18 with the control rods extending upwardly through the removable cover 1a of the pressure vessel 1.

Figure 4:
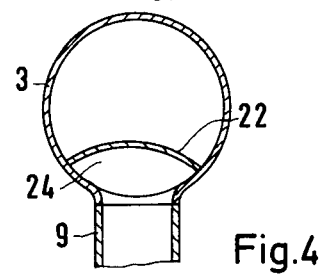
FIG. 4 is a vertical section taken on the line 4—4 in FIG. 3.

The line 9 is shown connecting with the hot leg 3 at a point adjacent to the space 12 and, as shown by FIGS. 3 and 4, supplies a high velocity ejecting nozzle 22 pointing towards the space 12 and, therefore, towards the guide tubes 13. With the arrangement of FIG. 1, the reactor protective system need not be relied on, a drop in the pressure of the coolant in the leg 3 permitting the check valve 9' to open under the pressure of the gas G and start the introduction of the emergency cooling water via the nozzle 22 which ejects a high velocity jet of the cooling water, as indicated by the arrow CW towards and into the space 12. By its velocity with consequent expansion in the space 12, and by reason of impingement against the guide tubes 13, the large-area water spray screen is promptly formed and maintained in this space 12, the latter representing a body of separated water cooling any steam and dropping the pressure resulting inside of the vessel 1 due to the loss-of-coolant accident. The balance of three-quarters or less of the cooling water EWS introduced through the larger pipe line 10, via the check valve 10' which can open due to the loss of pressure in the main coolant loop, then follows or is simultaneously introduced via the cold leg 5 to the outside of the core barrel 2a, the vessel now of reduced internal pressure, receiving this water in its bottom and filling upwardly to the level of the main loop connections 3 and 5. In this way the vessel 1 is filled with the surplus running off through the loop break. After exhaustion of the supply EWS other components of the emergency core cooling system may take over as required to continue core cooling, the vessel 1 then being filled with water and presenting no problems of filling.

Sicce the nozzle 22 is in the flow of coolant in the hot leg 3, it is shown as being of externally streamline contour. In effect, this nozzle only divides off a small convex portion 24 of the loop pipe 3, this being insufficient to interfere with the coolant flow to any appreciable degree.

Figure 5:
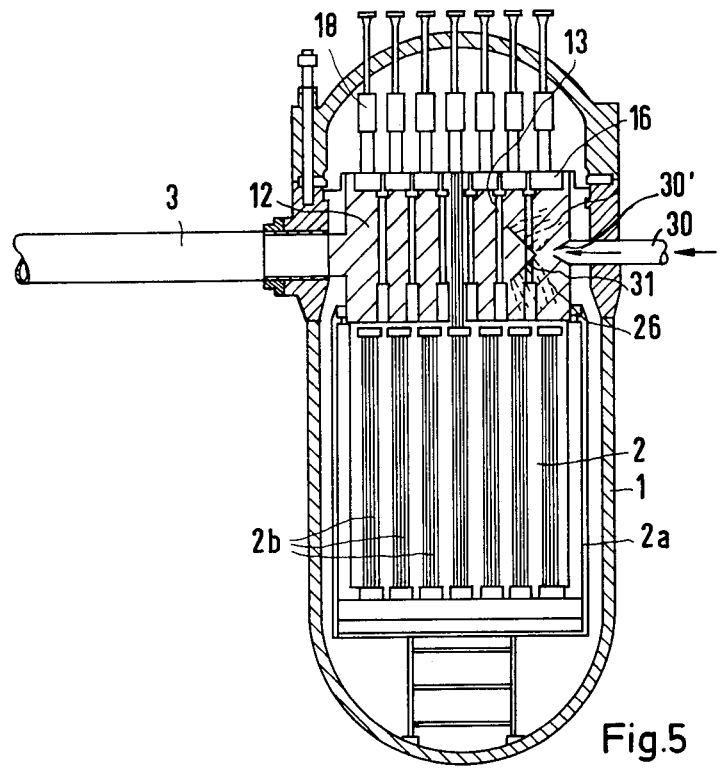
FIG. 5 is a view like FIG. 2, although somewhat schematic, and showing a modification of the invention.

FIG. 5 shows the emergency core cooling water being introduced via a nozzle 30 built into the vertical wall of the vessel 1 at a level such that its orifice 30' points directly into the space 12 and against the various control rod guides 13 in this space. To aid in the creation of the immediately forming large-area water spray screen in this space 12, baffles 31 are shown aligned with the nozzle orifice 30'. These break up the introduced high speed jet of water to aid in the formation of the screen in the space 12. It is this spray screen filling the space 12 that condenses the steam and drops the pressure inside of the pressure vessel.

Figure 6:
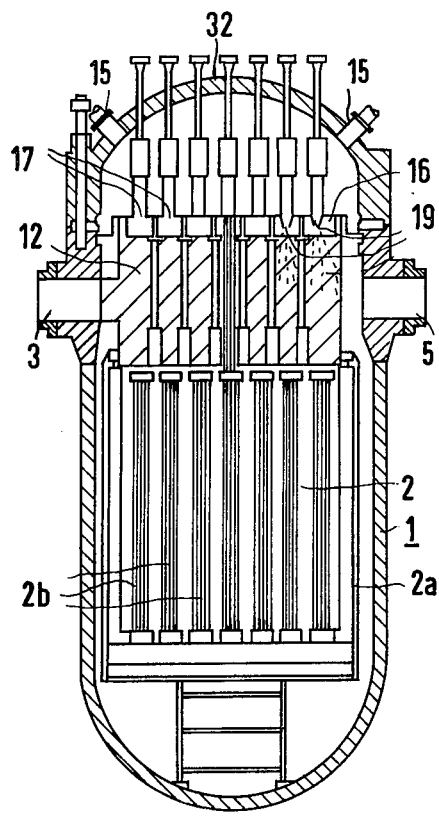
FIG. 6 is like FIG. 5 but shows a further modification.
Figure 7:
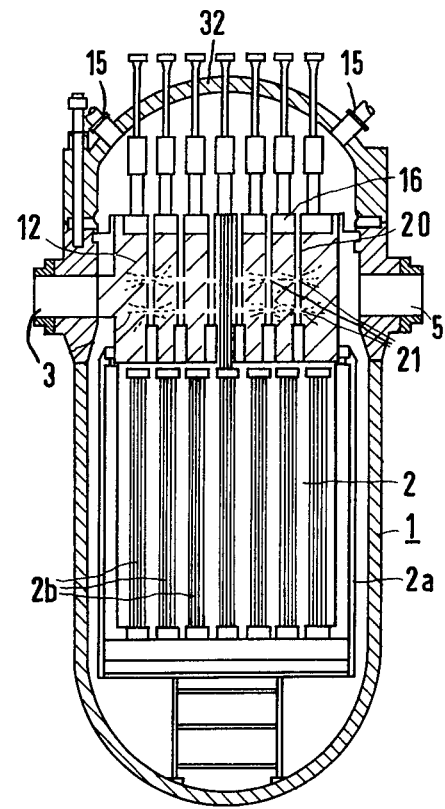
FIG. 7 is again like FIG. 5 but shows a still further modification.

In FIGS. 6 and 7 the emergency core cooling water is introduced via the vessel's cover 1a by using inlets 15 and, of course, connecting with the equivalent of the pipe line 9 previously described. In FIG. 6 the core barrel cover 16 is provided with downwardly pointing nozzles 19 although possibly the cover 16 may simply be provided with openings 17. In either case, the arrangement should be such that the water introduced via the inlets 15 from the tank T, should immediately and promptly form a wide or large area water spray screen completely filling the space 12 as much as possible.

FIG. 7 shows the modification wherein the core barrel cover 16 uses vertical pipes or tubes 20 having the horizontally directed nozzle orifices or jets 21 which eject the emergency cooling water at high velocities against the various control rod guide tubes. As previously indicated, these pipes 20 may comprise certain of the control rod guide tubes themselves.

It is to be understood that throughout the foregoing there is the concept that a portion, at least one-quarter for example, of the available supply of emergency core cooling water in the tank T, or possibly available from another source, in the event of a loss-of-coolant accident, should be ejected in spray form directly into the space 12 formed within the reactor's upper guide and support structure around and between its control rod guide tubes 13. This open area is directly above the core 2 and it is here a high pressure steam barrier tends to form in the event of the accident. By forming within this space the wide or large area spray screen of emergency cooling water droplets, the steam there is condensed with the result that the pressure within the vessel 1 drops. This initially introduced water forming the spray screen can, by itself, with the pressure drop, fall through the core barrel 2a and the core 2 to the bottom of the vessel 1. The balance of the emergency water supply, supplied as for example via the cold leg 5 at 10, can then flow into the vessel and down the descent space S to form a rising body of cooling water around the core 2 and up to the level of the coolant connections 3 and 5. This may be circulating water if the emergency cooling water supply is adequate or, as might be customary, be augmented by other sources of cooling water supplied via the conventional emergency core cooling system. The important thing is that the large area water spray screen formed in the space 12 initially drops the pressure that would otherwise prevent or seriously interfere with the introduction of adequate water for emergency core cooling purposes.

What is claimed is:

1. A pressurized-water reactor comprising a pressure vessel having a lower portion and an upper portion, a core in said lower portion, coolant inlet and outlet connections opening through said upper portion, a core barrel surrounding said core and extending upwardly to above said connections and forming a coolant descent space opening from and extending from said inlet connection downwardly to below said barrel and the barrel internally forming a substantially open space above said core and opening to said outlet connection, a main coolant loop having a cold leg connected to said inlet connection and a hot leg connected to said outlet connection, said loop and pressure vessel normally containing circulating pressurized-water coolant for said core; and an emergency core cooling system for said reactor for use in the event of a loss-of-coolant accident; wherein the improvement comprises said system having emergency means for supplying emergency cooling water from a volume of such water under pressure in the event of said accident, and spray means for spraying at least a portion of said emergency cooling water from said supply substantially throughout said open space above said core to form a large-area spray screen of said emergency cooling water in said open space said spray means comprising a single nozzle for ejecting a portion of said emergency cooling water in the form of a high velocity jet into said open space, said nozzle being directed horizontally through the wall of said vessel into said open space and wherein control rod guide tubes extend upwardly from said core and said open space is formed between and around said guide tubes, said nozzle ejecting said jet against at least one of said guide tubes.

2. The reactor of claim 1 in which said portion is at least one-quarter of said volume, and feeding means for feeding the balance of said volume to said descent space.

3. The reactor of claim 2 in which said feeding means feeds said balance to said cold leg for feeding to said descent space.

4. The reactor of claim 1 in which baffles are positioned in said open space and said nozzle is pointed towards said baffles.

5. A pressurized-water reactor comprising a pressure vessel having a lower portion and an upper portion, a core in said lower portion, coolant inlet and outlet connections opening through said upper portion, a core barrel surrounding said core and extending upwardly to above said connections and forming a coolant descent space opening from and extending from said inlet connection downwardly to below said barrel and the barrel internally forming a substantially open space above said core and opening to said outlet connection, a main coolant loop having a cold inlet connected to said inlet connection and a hot leg connected to said outlet connection, said loop and pressure vessel normally containing circulating pressurized-water coolant for said core; and an emergency core cooling system for said reactor for use in the event of a loss-of-coolant accident; wherein the improvement comprises said system having emergency means for supplying emergency cooling water from a volume of such water under pressure in the event of said accident, and spray means for spraying at least a portion of said emergency cooling water from said supply substantially throughout said open sapce above said core to form a large-area spray screen of said emergency cooling water in said open space said spray means comprising a nozzle in said hot leg and pointing therein towards said open space above said core.

6. The reactor of claim 5 in which said nozzle is positioned in said hot leg adjacent to said open space and said hot leg extends to said open space, said nozzle ejecting said portion of emergency cooling water in the form of a high-velocity jet into said open space.

7. The reactor of claim 6 in which control rod guide tubes extend upwardly from said core and said open space is formed between and around said guide tubes, and said nozzle ejects said jet against at least one of said guide tubes.

* * * * *